3,367,814
GLASS BANDING STRAP MAKING
Sol S. Weiner, Evanston, Burton A. Gale, Skokie, and George P. McNally, Lake Forest, Ill., assignors to CPS Industries, Inc., a corporation of Delaware
Filed July 17, 1963, Ser. No. 295,787
1 Claim. (Cl. 156—166)

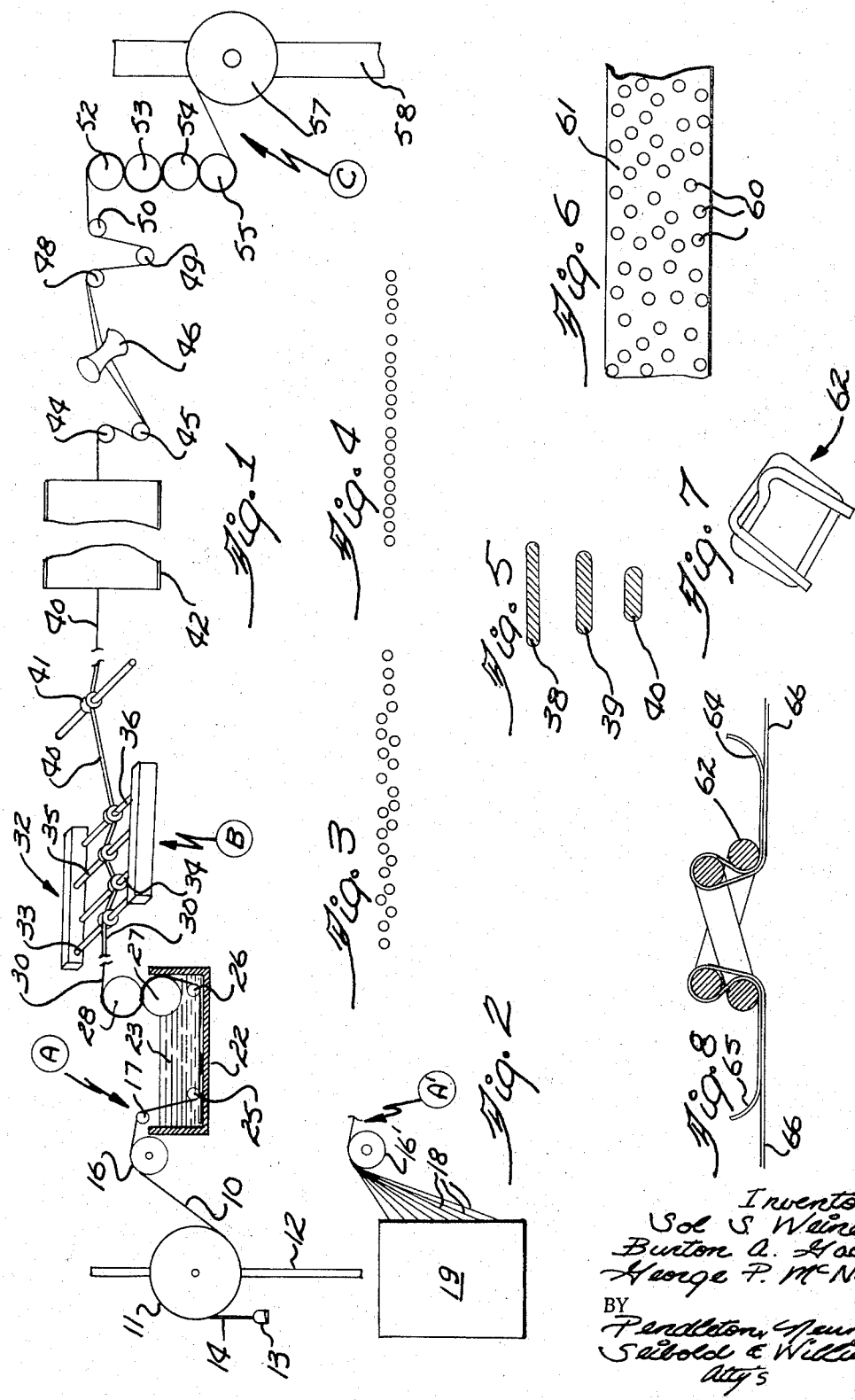

This invention relates to a non-metallic strapping material and method of manufacturing same. More particularly, it relates to an improved banding tie or tape comprising a plurality of non-woven, non-twisted parallel glass strands individually encapsulated in a major proportion of a pliant isolating medium to form a high-strength unitary structure, and method of manufacturing same.

It has long been recognized that for many purposes a non-metallic band for strapping cartons, bundles, bales, unitized loads, palletized shipments, and the like would have substantial advantages over the more-common and popular steel strapping. Accordingly, many non-ferrous straps, such as polyethylene, polypropylene, impregnated rayon, nylon, and the like, have been commercialized in recent years with some success. Filamentary glass has a number of superior properties uniquely commending its use for such purposes, e.g., high tensile, low stretch, fast and complete recovery from stress, substantial inertness, and great weather resistance. A number of practical problems, however, have obviated its use despite considerable effort to adapt same.

For example, glass filaments or strands abrade one another, have little resistance to shear and otherwise shatter or break very readily when subjected to relative rubbing movement or to other than pure tensile stresses, such as, for example, when knotted. Efforts have been made to isolate the glass strands with a thin coating of various materials such as thermoplastic resins, and thereby minimize abrading contact between individual strands. The resulting bands, while somewhat improved in tensile and knot strength, still have proved unsatisfactory in practice, leading those skilled in the art to the conclusion that "it couldn't be done." In addition, such resulting glass bands often could not be readily fastened by retightenable buckles and had to be permanently welded or clamped to be secured.

It is therefore an object of the present invention to provide a glass banding strap which is relatively free of the shortcomings which have rendered such straps non-feasible in the past. It is another object of the present invention to provide an inert, non-metallic strapping tape at competitive cost which can be fastened by buckles and has high tensile and knot strength, low stretch, and fast and complete recovery from stress. These and other objects of the present invention will become apparent as a detailed description thereof proceeds.

These objects are achieved by an improved glass banding strap which is prepared by providing a plurality of non-woven, non-twisted parallel strands of continuous glass filaments and maintaining the strands in a substantially side-by-side, at-least-intermittently-spaced relationship while the strands are contacted with an encapsulating elastomeric medium. The spacing of the strands assures complete envelopment of the strands in the encapsulating medium. The encapsulating elastomeric medium is typically in liquid form when brought in contact with the strands and is present in sufficient amount whereby the strands are enveloped in at least about 100%, based on volume of strands, of the encapsulating elastomeric medium. The strands are then drawn together in parallel relationship, and the encapsulating medium is subjected to fusing or solidifying conditions whereby a unitary, pliant strapping structure is formed.

It is an essential of the present process and product that the elastomeric encapsulating medium be present in a major proportion as above indicated, i.e., at least about 100%, based on volume of strands. Typically the elastomeric medium is present in amounts of about 130 to 800% by volume of strands, preferably 200 to 600%, optimally 250 to 450%.

It is believed that prior-art efforts to achieve a glass banding strap of the type herein contemplated was due in part to the failure to recognize the importance of employing a major proportion of the pliant encapsulating medium. A major proportion has a three-fold effect. It markedly decreases the possibility of the strands cutting through the resin and frictionally abrading one another. It markedly improves stress distribution throughout the straps so that individual strands are not overloaded, thereby avoiding progressive strand failure. Finally, it provides what might be called a "cushiony" effect which lends itself to the snubbing of the strap in a non-piercing, non-abrading buckle. Thus, the strap may have a desirable smooth surface, which can be readily threaded through a conventional strapping buckle, and yet will be substantially slip-free when tensioned.

Another heretofore-unappreciated shortcoming of prior-art glass straps was failure to appreciate the importance of selecting coatings having elastomeric or pliant properties. The preferred coatings of the present invention have such properties as evidenced, for example, by a "thumbnail" test. Thus, with moderate pressure one may indent a strap of the present invention with a thumbnail but the resulting depression will promptly substantially disappear. Moreover, the strap of the present invention may be flexed, bent over sharp angles or double-backed on itself without permanent deformation.

As will become apparent hereinafter, such elastomeric properties are preferably obtained by employing conventional plastic or resinous compositions containing substantial proportions of plasticizers, e.g., at least 2 wt. percent, typically 5 to 50 wt. percent, the particular amount of plasticizer in any particular case depending upon the inherent properties of the basic plastic or resin employed. Formulations of such coatings are well within the skill of the art in the light of the present disclosure. Thus, while novelty is not claimed herein in the coatings per se, the particular combination of a major proportion of such elastomeric coatings and glass filaments or strands as disclosed herein does accomplish what others in the field concluded "couldn't be done."

One of the advantageous aspects of the present process and product is the fact that common industrial continuous strand roving, which is one of the least costly forms of filimentary glass commercially available, ideally lends itself for use therein. Such roving is available from well-known commercial sources and typically may comprise, for example, 30 to 240 non-woven, non-twisted, non-plied parallel strands, each of the strands containing 51 to 408 parallel filaments, each of the filaments having a diameter of .00021 to .00060 inch. The continuous filaments are typically "E" glass of well-known composition and normally contain a sizing. The sizing should not, of course, be incompatible with the medium in which the strands are to be ultimately encapsulated. In an advantageous embodiment, the sizing is selected to increase the adhesiveness of the encapsulating medium to the glass.

As above indicated, there may be considerable variation in the thickness of the filaments, the number of filaments per strand and the number of strands per roving. In typical embodiments, however, the roving may contain 60 or 120 strands, each strand having 204 or 408 filaments of "E" glass having an average filament diameter of about .00036 inch. While reference is made herein to the fact that the glass filaments and strands must be "non-twisted," "parallel," and the like, it should be understood that such descriptive language is intended to encompass filaments and strands which are "substantially non-twisted," "substantially parallel," and the like.

While common industrial glass roving may be employed as the starting material and necessitates the spreading out of the strands to achieve substantially complete encapsulation thereof, the present process may advantageously be carried out at the time of strand manufacture. Thus after the individual filaments leave the melting furnaces and are gathered to form strands, the strands (or filaments) may be directly arranged in side-by-side spaced relationship for encapsulation and formation of the strap. This avoids the intermediate step of forming a roving and then spreading the roving into a spaced relationship for purposes of strand encapsulation.

The type of encapsulating medium depends in part on the method of encapsulation and vice versa. For example, for superior results, we prefer that the resin be in the form of an organosol, i.e., a finely-divided or colloidal dispersion of a synthetic resin in a plasticizer with or without solvents or other materials. Where the organosol is substantially solvent free, it is commonly referred to as a plastisol; and where the term organosol is used hereinafter, it is intended to include plastisols.

A preferred form of organosol comprises a dispersion of a vinyl resin, e.g., polyvinylchloride, in an organic plasticizer. For example, the organosol may comprise about 40 to 80 weight percent polyvinylchloride resin; about 10 to 30 weight percent phthalic acid derivatives, e.g., dioctylphthalate or dioctylisophthalate; optionally about 0–20 weight percent epoxy derivatives as a stabilizer, e.g., epoxydized soybean oil; and optionally about 0–20 weight percent diluent, e.g., mineral spirits.

Another organosol would comprise a dispersion of both an acrylic resin such as methyl methacrylate and a vinyl resin, e.g., polyvinylchloride, in an organic plasticizer. For example, about 5 to 15 weight percent of an acrylic resin such as methyl methacrylate may be substituted for a portion of thhe polyvinylchloride resin in the above-indicated formulation.

A specific formulation of an operable organosol-type encapsulating medium is as follows:

| Ingredient: | Amount, wt. percent |
| --- | --- |
| "Diamond PVC 7404" (polyvinylchloride resin) | 60.0 |
| "Flexol 380" (dioctylisophthalate) | 22.5 |
| "Paraplex G–62" (epoxydized soybean oil) | 10.0 |
| Diluent (6.5% mineral spirits, 0.5% xylal and 0.5 methylisobutyl ketone) | 7.5 |
| Total | 100.00 |

Such a resin is readily fused to form the elastomeric coating by subjecting same to elevated temperatures, e.g., 250° F. to 450° F., typically 300° F. to 400° F., for a period of about 0.05 to 5 minutes. When this formulation is used to encapsulate a roving with 60 strands of "E" glass containing 408 filaments each so as to form after fusion a substantially flat strap having a glass content of about 35–40 weight percent, an encapsulating-medium content of about 65–60 weight percent and a width of about ¼–⅜ inch, the resulting strap has been found to have a tensile strength of 590 pounds. [1]

Viscosity is usually an important consideration when carrying out the encapsulation step by immersion of the strands in an organosol or other liquid medium. The viscosity of the encapsulating medium should be sufficiently low so that the medium is workable, that is, the strands can be rapidly immersed and withdrawn on a high-speed production basis. At the same time viscosity should be sufficiently high so that adequate amounts of the medium are picked up by the strands so as to reach with one dip the requisite coating levels of at least 100 volume percent, based on strands. Typically, viscosity should be in the range of about 400 to 4000 centipoises (Brookfield, Spindle No. 2, 6 r.p.m., 70° F.), preferably about 1000 to 3000 centipoises, e.g., 1400 to 2200 centipoises.

Other methods of encapsulation may also be employed and those skilled in the art will recognize suitable encapsulation mediums which lend themselves to such methods. For example, other encapsulating mediums may comprise as a basic ingredient a plastic or resin such as diallyl phthalate, a furan compound, melamine formaldehyde, phenol formaldehyde, phenol furfural, a polyacrylic ester, a polyester, an alkyd resin, a silicone, urea formaldehyde, an epoxy resin, an allyl cast resin, a phenolic resin, and equivalents. They may also comprise as a basic ingredient an acetal polymer or copolymer; a cellulosic compound such as ethyl cellulose, cellulose acetate, cellulose propionate, cellulose acetate butyrate, and cellulose nitrate; a chlorinated polyether; nylon, polyethylene; polypropylene; a polycarbonate; polychlorotrifluoroethylene; polytetrafluoroethylene; a fluorocarbon; polystyrene; polyvinylidene fluoride; a urethane elastomer; and equivalents thereof. In most instances, particularly where the plastic or resinous composition does not inherently exhibit elastomeric properties, plasticizers must be added to develop such characteristic in the resulting encapsulating medium. The type and amount of plasticizer depend upon the nature of the basic resin to be plasticized and are within the skill of the art in the light of the present disclosure.

Where solutions and emulsions of one or more of the above are employed, it is usually necessary to apply a number of coats in order to build up the solids content to the requisite levels. Such multi-dip operations are costly, particularly in view of the drying or solvent-removal operations between dips and after the last dip which are required. Such is in marked contrast to the simple, single-dip operation characterizing the use of an organosol. Where other considerations dictate the use of a solution-type encapsulating medium, however, one may use, for example, the following formulation:

| Ingredient: | Amount, wt. percent |
| --- | --- |
| "Acryloid B–66" (methacrylate polymer) | 25 |
| Aromatic solvent (e.g., toluol) | 60 |
| Plasticizer (e.g., dibutylphthalate) | 15 |

Hot melt, extrusion, and equivalent techniques may also be employed in order to encapsulate the strands. In the case of hot melts (as in the case of organosols), viscosity should be controlled so as to assure sufficient pickup of the encapsulating medium in a single contacting step, preferably in the range of about 1000 to 3000 centipoises. The solidification of the encapsulating medium advantageously requires merely the cooling thereof. Extrusion techniques, while feasible from an operating standpoint, are at the present time generally considered non-competitive cost-wise with the more-simple and available technique of contacting the strands with an organosol or hot melt. A typical hot melt may comprise for example:

| Ingredient: | Amount, wt. percent |
| --- | --- |
| Vinyl resin (e.g., "Elvax") | 40 |
| Microcrystalline paraffin wax | 30 |
| Rosin derivatives (e.g., "Picco-Tac") | 30 |

In a particular embodiment, regardless of the method of application, the glass strands may be first coated with a "tie" coat, which functions to increase the adhesiveness of the glass and encapsulating medium with respect to each other. This would obviate the possibility that the bond between the two might under certain circumstances be a "weak link" in the system.

This may be advantageously accomplished, as previously indicated, by selecting a filament sizing which is not only compatible with, but "locks" the encapsulating me-

---

[1] With the specific gravities of the resin and glass approximating 1.3 and 2.5, respectively, the volumetric resin content of the strap just described is about 290–360 volume percent.

dium to the glass. Alternatively, the glass strands may be subjected to a pre-coating (and heating) step whereby a "tie" coat is applied. For example, when using a vinyl resin organosol as the encapsulating medium, the glass strands may initially be coated with catalyzed polyvinylchloride acetate resin and dried or heated. In general, the amount of tie coat is substantially less than the amount of encapsulating medium subsequently added, e.g., from 1 to 50% of the amount of the encapsulating medium. This avoids any substantial deleterious effect on the elastomeric properties of the encapsulating medium.

The present invention will be more clearly understood from the following detailed description, read in conjunction with the accompanying drawing, wherein:

FIG. 1 is a schematic flow sheet of a preferred embodiment of the present process, wherein common industrial roving is employed as the starting material;

FIG. 2 schematically illustrates a substitute initial step in the process of FIG. 1 employing a plurality of glass strands, rather than a roving, as the starting material;

FIG. 3 presents an enlarged cross-section of the roving as it appears after it is spread at point A in FIG. 1;

FIG. 4 presents an enlarged cross-section of the glass strands as they appear at point A' in FIG. 2;

FIG. 5 illustrates progressive cross-sections of the encapsulated glass strands as they are shaped into a strap at point B in FIG. 1;

FIG. 6 is an enlarged cross-section of a portion of the finished strap after fusing or solidifying the encapsulating medium and finally shaping same;

FIG. 7 is a commercial buckle of the type which may be employed to secure the ends of the strap of the present invention; and FIG. 8 is an enlarged cross-section of the buckle of FIG. 7 showing how both ends of the strap are threaded thereabout to form a secure retightenable connection.

Referring to the drawings, conventional industrial roving 10 is unwound from a ball supply thereof 11 which is supported on unwind stand 12. Stand 12 is equipped with a variable tension device such as a weight 13 suspended over axis of ball supply 11 by a thong or rope 14. Roving 10 may comprise, for example, 60 parallel, non-twisted glass strands, each strand having 408 parallel filaments of "E" glass having an average filament diameter of about .00036 inch.

Roving 10, which is substantially intact with a minimum of "catenary," proceeds to spreading wheel device 16, where the strands of the roving are progressively spread into at-least-intermittently-spaced relationship. Thus at A, where the strands pass over direction-changing bar 17, the strands are spread out as illustrated in magnified form in FIG. 3. The spreading of the roving is important to insure full encapsulation of the individual strands.

In the alternative embodiment presented in FIG. 2, individual glass strands 18 leave supply source 19. Supply source 19 may comprise a battery of gathering and sizing devices which form the individual strands from a plurality of glass filaments leaving a melting furnace. Since the strands are not collected into a roving, they may be individually guided into spaced relationship on guide wheel 16'. The spacing and arrangement of the strands may thus be quite uniform, as illustrated in magnified form in FIG. 4.

In both embodiments the plurality of spread-out strands are guided over direction-changing bar 17 into vessel 22 containing encapsulation bath 23, which bath in one preferred embodiment may comprise a vinyl resin organosol of the composition set forth in col. 3, lines 46–53 of this specification. Such bath may have, for example, a viscosity in the preferred range of about 1400 to 2200 centipoises (Brookfield, Spindle No. 2, 6 r.p.m., 70° F.).

In passing through the bath, the spread-out glass strands are held under the liquid organosol by bars 25 and 26. The impregnated roving 30 then passes around coating rollers 27 and 28 which serve as resin metering devices.

As a specific example, the total submerged traverse of the spread-out roving through bath 23 may be about 10 to 15 inches. The traverse speed may be approximately 20 feet per minute. The spread-out strands of impregnated roving 30 leaving metering roll 28 would typically be encapsulated in about 150–200% by volume, based on strands, of the organosol.

Impregnated roving 30 then passes through "ladder" device 32, which in FIG. 1 is tilted so as to present a more-revealing perspective view. In device 32, the impregnated roving passes over bar 33, under bar 34, over bar 35 and under bar 36, each of which bars is eccentrically located and has guide collars thereon of progressively-narrower spacing. As a result, the spread-out impregnated roving is gradually brought together so that as it leaves bar 36 it has a somewhat rope-like cross-section. Progressive steps in the formation of such cross-section in device 32 are illustrated in FIG. 5, i.e., progressive cross-sections 38, 39 and 40. The rope-like configuration is desired prior to the organosol fusion step in order to insure that all of the encapsulated strands are collected into a unitary-substantially uniform structure, the ultimately-desired flat strap configuration to be imparted thereto after fusion.

Thus, the resulting structure 40 with rope-like cross-section passes over final shaping collar 41, which controls width, if necessary, prior to entry of the tape into the fusion oven. In a particular example, the width of the roving at shaping collar 41 may be about ½ inch.

Roving 40 then passes into infrared oven 42 at the previously-indicated speed of 20 feet per minute, which oven is approximately 6 feet in length and heats the organosol encapsulating medium to about 350° F. to 400° F., thereby fusing the organosol. As the roving leaves infrared oven 42, the fused organosol is still hot and plastic so that the rope-like configuration thereof may be spread and flattened by tension rollers 44 and 45. Tension rollers 44 and 45 may be, for example, Teflon wheels having a ½-inch diameter.

The flattened tape, in one embodiment of the process, is then passed around radius roller 46 which may comprise a 2-inch wide Teflon roller having a diameter at the outer edges of about ⅞ inch and a diameter at the center of about ⅝ inch. While roller 46 is portrayed as being tilted from the horizontal for purposes of illustration, its axis may be horizontal and in the same plane as the tape although not necessarily at a right angle to the direction of travel thereof. In fact, in some cases it has been found that by turning the axis of the roller so that it is at an angle of, for example, about 60°, rather than 90°, to the direction of tape travel, improved control over tape width may result. The resulting flat tape of substantially uniform width is cooled, e.g., by a fan (not shown), and then passes around a series of tension bars 48, 49 and 50, etc., followed, optionally, by a gauging collar (not shown) to give a visual indication of final size. This may be conveniently accomplished by providing a gauging collar having the exact desired width of the strap.

The strap then enters a series of draw rolls 52, 53, 54 and 55, which pull the strap through all the preceding steps. They may be equipped with a variable direct-current electric drive as a convenient means of speed regulation. The strap is then collected on spool 57 which is supported on frame 58.

An enlarged portion of cross-section of the resulting strap is shown in FIG. 6. The glass strands 60 are portrayed more distinctly in FIG. 6 than is apparent by examination of a typical cross-section. In fact, a scissor-cut cross-section may appear substantially homogeneous, the glass strands 60 and encapsulation medium 61 blending together, indicating possible encapsulation of individual glass filaments. A typical strap may have a width of ⅜ inch and an average thickness of approximately ³⁄₆₄ inch. The strap thickness may be transversely uniform, or, alternatively, slightly bowed out at the center with slightly tapered marginal portions.

Such a strap, having a smooth surface with excellent flex properties, can be readily threaded through a conventional bent-metal strap buckle 62 such as is illustrated in FIG. 7, or equivalent thereof, e.g., a plastic buckle. How the strap is threaded through such a buckle is illustrated on an enlarged scale in FIG. 8. The strap may, of course, be secured by other conventional techniques, e.g., clamping, welding, or the like.

One of the unique features of the strap of the present invention is, as aforementioned, its ability to hold securely in buckles of the type of FIG. 7, which permit retensioning or retightening, even though the surfaces of the strap as well as the buckle are substantially smooth. This is due to the self-snubbing characteristics of the strap, which are in turn attributable to the presence of a major portion of an encapsulating medium which is elastomeric. In practice, for example, free ends 64 and/or 65 are pulled until the article-encircling portion 66 of the strap is fully tensioned. As soon as ends 64 and 65 are released from tension, jamming cushions or wedges are formed, primarily at the junction of the free ends 64 and 65 with buckle 62, thereby preventing slippage. Should the encircled article shrink or otherwise require more tension, free ends 64 and 65 may again be pulled or tensioned, thereby drawing more of portion 66 through the buckle. When free ends 64 and 65 are again released, new jamming cushions or wedges are formed as previously indicated to prevent back slippage.

From the above description of a specific embodiment, it is apparent that the aforementioned objects of the present invention have been achieved. In addition, a non-metallic strap is provided which has substantially all of the advantages of prior-art steel strapping without many of the disadvantages of either steel strapping (including danger) or other non-metallic substitutes for steel strapping.

While the method and strap of the present invention have been described with particular reference to a specific process flow sheet and strap produced thereby, such are merely illustrative of single embodiments, and the inventive concept herein is not limited thereto. Many alternative and equivalent modifications will be apparent from the above description to those skilled in the art. Such alternative and equivalent embodiments are considered within the scope and spirit of the present invention, and it is the intention to cover same by the Letters Patent to be issued hereon.

Having described the invention, what is claimed is:

1. A method of manufacturing a glass filament strapping band comprising the steps of:
   (a) providing a plurality of strands of glass filaments in substantially parallel relationship to form a roving;
   (b) coating said glass filamentous roving with a composition of a vinyl resin material;
   (c) progressively narrowing said coated roving and then subjecting said coated roving in a fusion area having a temperature range from about 250 degrees Fahrenheit to about 450 degrees Fahrenheit; and
   (d) progressively tensioning said roving by means of a roller device and subsequently sizing said coated roving by means of a radius roller to provide a substantially predetermined uniform width strapping band.

References Cited
UNITED STATES PATENTS

| | | | |
|---|---|---|---|
| 2,741,294 | 4/1956 | Pancherz | 156—166 X |
| 2,750,030 | 6/1956 | Tierney | 161—144 X |
| 2,758,342 | 8/1956 | Squires | 161—144 |
| 2,979,431 | 4/1961 | Perrault | 156—180 X |
| 3,248,274 | 4/1966 | Karrass | 156—166 X |

JACOB H. STEINBERG, *Primary Examiner.*